United States Patent
Kimura et al.

(10) Patent No.: US 10,837,447 B2
(45) Date of Patent: Nov. 17, 2020

(54) VACUUM PUMP HAVING A FIRST HOUSING WITH A SUPPLY PORT AND A SECOND HOUSING WITH A RECESS PORTION

(71) Applicant: ULVAC, INC., Chigasaki (JP)

(72) Inventors: Yasuhiro Kimura, Chigasaki (JP); Shinnosuke Tokuhira, Chigasaki (JP); Hideaki Inoue, Chigasaki (JP); Kenji Machiya, Chigasaki (JP)

(73) Assignee: ULVAC, INC., Chigasaki (JP)

( * ) Notice: Subject to any disclaimer, the term of this patent is extended or adjusted under 35 U.S.C. 154(b) by 0 days.

(21) Appl. No.: 16/652,260

(22) PCT Filed: May 30, 2018

(86) PCT No.: PCT/JP2018/020668
§ 371 (c)(1),
(2) Date: Mar. 30, 2020

(87) PCT Pub. No.: WO2019/087447
PCT Pub. Date: May 9, 2019

(65) Prior Publication Data
US 2020/0240412 A1 Jul. 30, 2020

(30) Foreign Application Priority Data
Oct. 30, 2017 (JP) ................... 2017-209715

(51) Int. Cl.
*F04C 25/02* (2006.01)
*F04C 29/02* (2006.01)
(Continued)

(52) U.S. Cl.
CPC .............. *F04C 29/02* (2013.01); *F04C 25/02* (2013.01); *F16C 33/6659* (2013.01); *F16N 7/26* (2013.01); *F16N 7/32* (2013.01)

(58) Field of Classification Search
CPC ........ F04C 29/02; F04C 25/02; F04C 29/028; F16C 33/6659; F16C 33/66; F16C 33/6666; F16C 33/6651; F16N 7/26; F16N 7/32
See application file for complete search history.

(56) References Cited

U.S. PATENT DOCUMENTS 2,447,671 A * 8/1948 Schuck ............... F16C 33/6666
384/468
2,708,985 A * 5/1955 Evans ...................... F16N 7/32
184/11.1
(Continued)

FOREIGN PATENT DOCUMENTS

JP 63-1794 A 1/1988
JP 1-313691 A 12/1989
(Continued)

OTHER PUBLICATIONS

International Search Report in International Application No. PCT/JP2018/020668, filed May 30, 2018.

*Primary Examiner* — Deming Wan
(74) *Attorney, Agent, or Firm* — Saliwanchik, Lloyd & Eisenschenk (57) ABSTRACT

[Object] To efficiently supply lubricant oil to a bearing member with a simple mechanism.
[Solving Means] A vacuum pump includes a first housing, a second housing, a rotor shaft, a lubricant oil-stirring plate, and a bearing member. The second housing is attached to the first housing and forms a space that stores lubricant oil together with the first housing. The rotor shaft passes through the first housing. The lubricant oil-stirring plate is housed in the space and is attached to the rotor shaft. The bearing member is fixed to the first housing and rotatably supports the rotor shaft. The first housing includes a supply port that enables lubricant oil to be supplied to the bearing member. The second housing includes an inner-wall upper portion which the lubricant oil stirred by the lubricant oil-stirring plate hits against. The inner-wall upper portion of the second housing includes a recess portion that enables the lubricant oil to move above the supply port.

6 Claims, 10 Drawing Sheets

(51) Int. Cl.
*F16C 33/66* (2006.01)
*F16N 7/26* (2006.01)
*F16N 7/32* (2006.01)

(56) References Cited

U.S. PATENT DOCUMENTS

| | | | | |
|---|---|---|---|---|
| 3,499,503 | A * | 3/1970 | Geary, Jr. | F01D 25/18 |
| | | | | 184/11.1 |
| 5,591,020 | A * | 1/1997 | Rockwood | B05D 7/00 |
| | | | | 184/11.2 |
| 6,460,656 | B1 * | 10/2002 | Jones, Jr. | F16C 33/664 |
| | | | | 184/11.1 |
| 9,169,738 | B2 * | 10/2015 | Schlienger | F01D 25/125 |
| 2008/0175704 | A1 * | 7/2008 | Rockwood | F16N 7/26 |
| | | | | 415/111 |
| 2011/0103986 | A1 * | 5/2011 | Ito | F16C 37/007 |
| | | | | 417/572 |
| 2015/0308307 | A1 * | 10/2015 | Nation | F04B 53/18 |
| | | | | 184/11.2 |

FOREIGN PATENT DOCUMENTS

| | | |
|---|---|---|
| JP | 4-160299 A | 6/1992 |
| JP | 7-41128 U | 7/1995 |
| JP | 2003-129979 A | 5/2003 |
| JP | 2011-94761 A | 5/2011 |
| JP | 2011-202534 A | 10/2011 |
| JP | 2012-162989 A | 8/2012 |
| JP | 2014-214845 A | 11/2014 |
| JP | 2016-152638 A | 8/2016 |

* cited by examiner

VACUUM PUMP HAVING A FIRST HOUSING WITH A SUPPLY PORT AND A SECOND HOUSING WITH A RECESS PORTION

CROSS-REFERENCE TO RELATED APPLICATIONS

This application is the U.S. national stage application of International Patent Application No. PCT/JP2018/020668, filed May 30, 2018, which claims the benefit under 35 U.S.C. § 119 of Japanese Application No. 2017-209715, filed Oct. 30, 2017, the disclosures of each of which are incorporated herein by reference in their entirety.

TECHNICAL FIELD

The present invention relates to a vacuum pump capable of performing vacuum evacuation on a vacuum container.

BACKGROUND ART

In a vacuum pump represented by a rotary pump, a mechanical booster pump, and the like, it is necessary to lubricate a bearing member that supports a rotor shaft of a rotor. Therefore, lubricant oil is stored in a housing that houses the bearing member, a stirring plate that stirs the lubricant oil during operation of the rotor shaft is rotated, and the lubricant oil stirred in the housing is supplied to the bearing member (e.g., see Patent Literature 1).

CITATION LIST

Patent Literature

Patent Literature 1: Japanese Patent Application Laid-open No. 2012-162989

DISCLOSURE OF INVENTION

Technical Problem

In such a vacuum pump, how to efficiently supply lubricant oil to a bearing member with a simple mechanism is a problem.

In view of the above-mentioned circumstances, it is an object of the present invention to provide a vacuum pump that efficiently supplies lubricant oil to a bearing member with a simple mechanism.

Solution to Problem

In order to accomplish the above-mentioned object, a vacuum pump according to an embodiment of the present invention includes a first housing, a second housing, a rotor shaft, a lubricant oil-stirring plate, and a bearing member. The second housing is attached to the first housing and forms a space that stores lubricant oil together with the first housing. The rotor shaft passes through the first housing. The lubricant oil-stirring plate is housed in the space and is attached to the rotor shaft. The bearing member is fixed to the first housing and rotatably supports the rotor shaft. The first housing includes a supply port that enables lubricant oil to be supplied to the bearing member. The second housing includes an inner-wall upper portion which the lubricant oil stirred by the lubricant oil-stirring plate hits against. The inner-wall upper portion of the second housing includes a recess portion that enables the lubricant oil to move above the supply port.

With such a vacuum pump, the inner-wall upper portion of the second housing includes the recess portion that allows the lubricant oil to move above the supply port. Therefore, after the lubricant oil stirred by the lubricant oil-stirring plate hits against the inner-wall upper portion, the lubricant oil is guided above the supply port via the recess portion. With this configuration, it becomes unnecessary to attach an oil guide member that guides the lubricant oil above the supply port to the second housing. It is thus possible to efficiently supply the lubricant oil to the bearing member with a simple mechanism.

In the above-mentioned vacuum pump, the recess portion may include a first recess portion and a second recess portion. The second recess portion may be aligned with the first recess portion in a first direction orthogonal to an axis direction of the rotor shaft. The second recess portion in the first direction has a width which may be smaller than a width of the first recess portion in the first direction. The first recess portion has a depth which may be configured to become shallower toward the bearing member from the lubricant oil-stirring plate.

With such a vacuum pump, the flow of the lubricant oil 180 which flows along the inner surface of the first recess portion is interrupted by the second recess portion. The interrupted lubricant oil moves along the first recess portion or the second recess portion which is shallower toward the bearing member from the lubricant oil-stirring plate and is guided above the supply port of the second housing.

In the above-mentioned vacuum pump, the first recess portion includes an inner surface which may be configured as a curved surface or multi-surface protruding in a depth direction of the recess portion.

With such a vacuum pump, the inner surface of the first recess portion is constituted by the curved surface protruding in the depth direction and the like. Therefore, it becomes difficult for the lubricant oil hitting against the first recess portion to flow down from the inner surface of the first recess portion.

In the above-mentioned vacuum pump, the second recess portion includes an inner surface which may be configured as a curved surface or a polygonal surface protruding in a depth direction of the second portion.

With such a vacuum pump, the flow of the lubricant oil 180 which flows along the inner surface of the first recess portion is reliably interrupted by the second recess portion. The interrupted lubricant oil moves along the first recess portion or the second recess portion which is shallower toward the bearing member from the lubricant oil-stirring plate and is guided above the supply port of the second housing.

In the above-mentioned vacuum pump, the inner surface of the first recess portion may be provided continuously with the inner surface of the second recess portion. At a boundary between the inner surface of the first recess portion and the inner surface of the second recess portion, an angle formed by the inner surface of the first recess portion and the inner surface of the second recess portion is equal to or smaller than 90 degrees.

With such a vacuum pump, the flow of the lubricant oil 180 which flows along the inner surface of the first recess portion is reliably interrupted by a corner portion having the angle equal to or smaller than 90 degrees. The interrupted lubricant oil moves along the first recess portion or the second recess portion which is shallower toward the bearing member from the lubricant oil-stirring plate and is guided above the supply port of the second housing.

Advantageous Effects of Invention

As described above, in accordance with the present invention, a vacuum pump that efficiently supplies lubricant oil to a bearing member with a simple mechanism is provided.

BRIEF DESCRIPTION OF DRAWINGS

FIGS. 4(a)-4(b) FIG. 4(a) is a schematic perspective view showing a periphery of a bearing member of the vacuum pump.

MODE(S) FOR CARRYING OUT THE INVENTION

Hereinafter, an embodiment of the present invention will be described with reference to the drawings. In each of the drawings, XYZ-axis coordinates are introduced in some cases. For example, the X-axis direction and the Y-axis direction respectively denote horizontal directions orthogonal to each other and the Z-axis direction denotes a vertical direction (gravity direction) orthogonal to them.

Figure 1A:
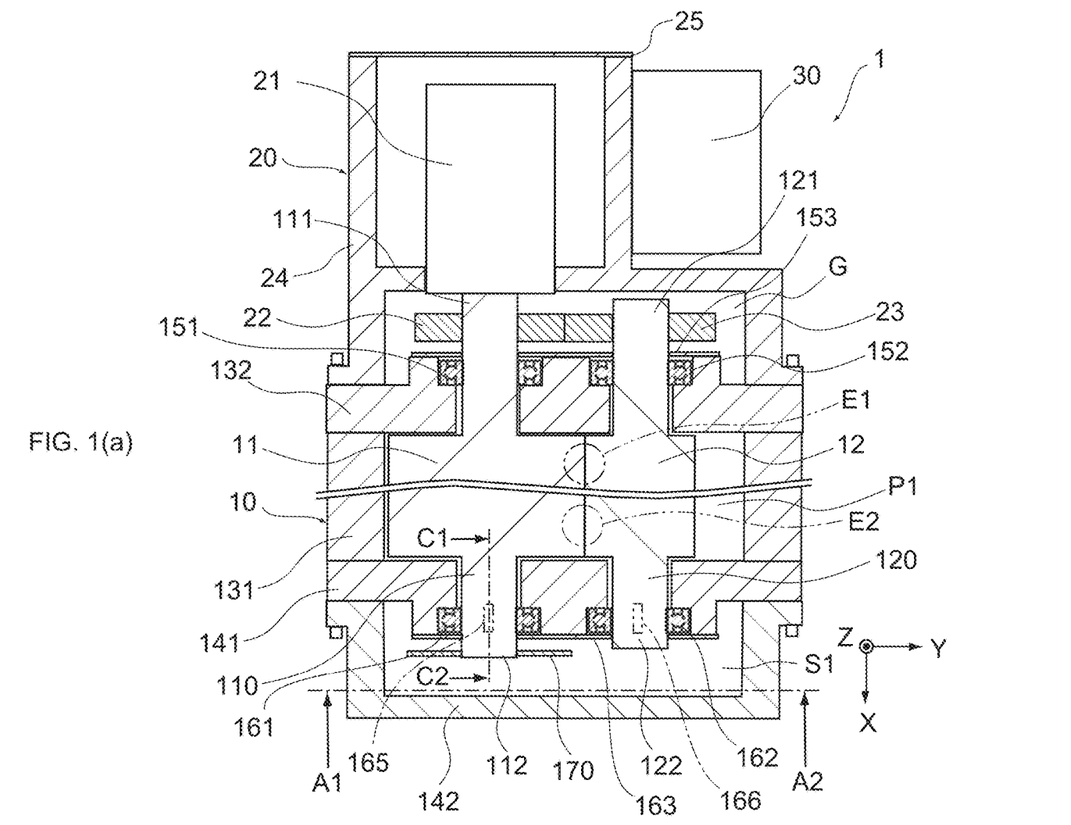
FIGS. 1(a)-1(b) Schematic cross-sectional views each showing a vacuum pump according to this embodiment.
Figure 1B:
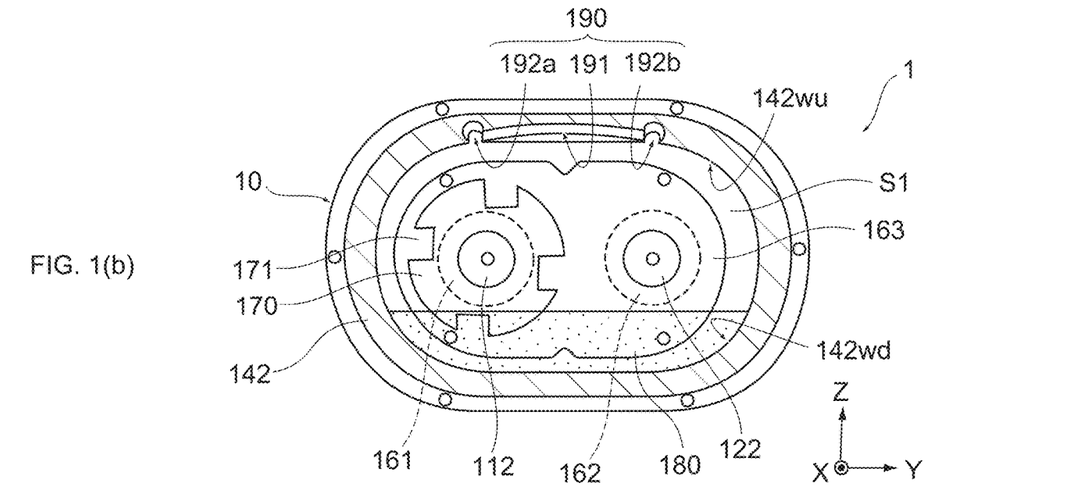

FIG. 1(a) and FIG. 1(b) are schematic cross-sectional views each showing a vacuum pump according to this embodiment. FIG. 1(a) shows a cross-section of a vacuum pump 1 as it is viewed from above. FIG. 1(b) shows a cross-section taken along the line A1-A2 of FIG. 1(a).

A mechanical booster pump, for example, is shown as the vacuum pump 1 illustrated in FIG. 1(a) and FIG. 1(b). The vacuum pump according to this embodiment is not limited to the mechanical booster pump and may be a screw pump, a rotary pump, or the like.

As shown in FIG. 1(a), the vacuum pump 1 includes a pump main body 10, a drive unit 20, and a control unit 30.

(Pump Main Body 10)

The pump main body 10 includes a first housing 141, a second housing 142, a third housing 131, a fourth housing 132, pump rotors 11 and 12, bearing members 151, 152, 161, and 162, and a lubricant oil stirring plate 170.

The housing 131 is a cylindrical container. The housings 132 and 141 are partition wall plates. Each of the housings 132 and 141 is fixed to the housing 131 in the X-axis direction. The housings 131, 132, and 141 form a pump chamber P1, such that the airtightness of the pump chamber P1 is ensured. The pump rotors 11 and 12 are housed in the pump chamber P1.

The pump rotors 11 and 12 are arranged facing each other in the Y-axis direction. The pump rotor 11 includes a rotor shaft 110 parallel to the X-axis direction. The pump rotor 12 includes a rotor shaft 120 parallel to the X-axis direction. One end portion 111 of the rotor shaft 110 is rotatably supported on a bearing member 151 fixed to the housing 132. Another end portion 112 of the rotor shaft 110 is rotatably supported on a bearing member 161 fixed to the housing 141. One end portion 121 of the rotor shaft 120 is rotatably supported on a bearing member 152 fixed to the housing 132. Another end portion 122 of the rotor shaft 120 is rotatably supported on a bearing member 162 fixed to the housing 141. Further, predetermined clearances are formed between the pump rotor 11 and the pump rotor 12 and between the pump rotors 11 and 12 and an inner wall of the pump chamber P1, such that those are each configured to rotate in a contactless manner.

Further, an oil entry inhibiting mechanism (not shown) is provided between the one end portions 111, 121 and the housing 132 and between the other end portions 112, 122 and the housing 141 so as to inhibit lubricant oil, which is liquid, from entering the pump chamber P1 from outside the pump chamber P1.

The bearing members 151 and 152 are covered with a cover 153 by bolt tightening via a seal ring member (not shown). Further, the bearing members 161 and 162 are covered with a cover 163 by bolt tightening via a seal ring member (not shown). By covering the bearing members 161 and 162 with the cover 163, a path to a space S1 is ensured for each of supply ports 165 and 166.

In the vacuum pump 1, for example, the bearing members 151 and 152 are fixed in a thrust direction and the bearing members 161 and 162 are arranged to be movable in the thrust direction. The supply port 165 which enables lubricant oil to be supplied to the bearing member 161 is provided above the bearing member 161 in the Z-axis direction. Similarly, the supply port 166 which enables lubricant oil to be supplied to the bearing member 162 is provided above the bearing member 162. Each of the supply ports 165 and 166 is formed in the housing 141, for example. Each of the supply ports 165 and 166 is in communication with the bottom portion of the space S1.

The housing 142 is attached to the housing 141 on a side opposite to the housing 131. The housing 142 forms the space S1 for storing lubricant oil 180 together with the housing 141. The lubricant oil 180 is stored in the bottom portion of the space S1. The other end portion 112 of the rotor shaft 110 and the other end portion 122 of the rotor shaft 120 passes through the housing 141. Those other end portions 112 and 122 reach the space S1. In addition, the lubricant oil-stirring plate 170 is attached to the other end portion 112. The lubricant oil-stirring plate 170 is housed in the space S1.

As shown in FIG. 1(b), a lower portion of the lubricant oil-stirring plate 170 is immersed in the lubricant oil 180. The lubricant oil-stirring plate 170 includes a plurality of cutout portions 171. When the lubricant oil-stirring plate 170 is rotated by rotation of the rotor shaft 110, the lubricant oil 180 is moved upward from an oil surface 180s by the cutout portions 171 and the lubricant oil 180 is stirred upward from the oil surface 180s. The stirred lubricant oil 180 is sprinkled upward in the space S1.

The lubricant oil 180 sprinkled upward in the space S1 hits against an inner wall of the housing 142. For example, the lubricant oil 180 hits against an inner-wall upper portion 142wu located above the oil surface 180s. Further, the vacuum pump 1 includes a recess portion 190 at the inner-wall upper portion 142wu. The recess portion 190 enables the lubricant oil 180 to move above the supply ports 165 and 166. The recess portion 190 includes a recess portion 191 and recess portions 192a and 192b. The recess portions 192a and 192b are provided on both sides of the recess portion 191 in the Y-axis direction. Further, the inner-wall upper portion 142wu and an inner-wall lower portion 142wd located below the inner-wall upper portion 142wu are configured as curved surfaces. A configuration and actions of the recess portion 190 provided in the inner-wall upper portion 142wu will be described later in detail.

Further, the lubricant oil-stirring plate 170 may be attached to the other end portion 122 of the rotor shaft 120. In addition, lubricant oil-stirring plates 170 may be attached to both the other end portions 112 and 122. In this case, the lubricant oil-stirring plates 170 are attached to both the other end portions 112 and 122 such that the attached lubricant oil-stirring plates 170 do not come into contact with each other. For example, the two lubricant oil-stirring plates 170 are disposed, deviated from each other in the X-axis direction.

Further, in this embodiment, the housing 141 will be referred to as a first housing and the housing 142 will be referred to as a second housing in some cases. Further, the recess portion 191 will be referred to as a first recess portion and the recess portions 192a and 192b will be collectively referred to as a second recess portion in some cases.

(Drive Unit 20)

The drive unit 20 includes a motor 21, synchronization gears 22 and 23, a housing 24, and a cover 25.

The one end portion 111 of the rotor shaft 110 of the pump rotor 11 and the one end portion 121 of the rotor shaft 120 of the pump rotor 12 pass through the housing 132. The motor 21 is fixed to the one end portion 111 of the rotor shaft 110. In addition, a synchronization gear 22 is fixed to the one end portion 111 between the motor 21 and the bearing member 151. A synchronization gear 23 that meshes with the synchronization gear 22 is fixed to the one end portion 121 of the rotor shaft 120.

The motor 21 and the synchronization gears 22 and 23 are housed in the housings 24 and 132. The airtightness is kept between the motor 21 and the housing 24. In other words, the vacuum pump 1 is a so-called canned motor pump. A gear chamber G contains lubricant oil for lubricating the synchronization gears 22 and 23 and the bearing members 151 and 161. The component of the lubricant oil may be the same as the lubricant oil 180 or may be different from that of the lubricant oil 180.

A front end of the housing 24 is covered with the cover 25. The cover 25 includes a through-hole communicable with the outside air. With this configuration, the motor 21 arranged adjacent to the drive unit 20 can be cooled in accordance with an air-cooling method or water-cooling method (not shown).

By driving the motor 21, the pump rotors 11 and 12 are rotated in directions opposite to each other via the synchronization gears 22 and 23. For example, the number of revolutions is 500 rpm or more and 5000 rpm or less. With this configuration, gas is transported from a gas intake port E1 provided above the pump main body 10 to a gas discharge port E2 provided beneath the pump main body 10. A gas intake pipe which communicates with an inside of a vacuum chamber (not shown) is connected to the gas intake port E1. A gas discharge pipe (not shown) or a gas intake port of an auxiliary pump is connected to the gas discharge port E2.

Further, also in the drive unit 20, a supply port for lubricating the bearing members 151 and 161 and a recess portion of moving the lubricant oil to the supply port may be formed. The recess portion may be formed in an inner-wall upper portion of the housing 132. In this case, the synchronization gears 22 and 23 have the function of the stirring plate. In addition, a lubricant oil-stirring plate may be attached to at least either one of the one end portion 111 or 121 as a means for stirring the lubricant oil.

(Control Unit 30)

The control unit 30 includes a circuit board housed in a metal casing disposed in the housing 24 and various electronic components mounted thereon. For example, an inverter circuit and the like are arranged on the circuit board. For example, the number of revolutions of the pump rotors 11 and 12 are controlled by the control unit 30.

The housings 131, 132, 141, and 24 are made of an iron-based material such as cast iron and stainless steel, for example. The housing 142 is made of a non-iron material such as an aluminum alloy, for example. Those housings are coupled to each other by bolt tightening via a seal ring member (not shown). Further, the pump rotors 11 and 12 include cocoon-shaped rotors made of an iron-based material such as cast iron.

Further, for the lubricant oil, it is favorable that a steam pressure thereof is low in order to satisfy an ultimate pressure of a pump P1 which is required as the vacuum pump 1. For example, it is favorable that the steam pressure of the lubricant oil at 80° C. is $1 \times 10^{-2}$ Pa or less. As specific lubricant oil, any of fluorine oil (kinetic viscosity: 97 mm$^2$/s (40° C.), 13 mm$^2$/s (100° C.)), mineral oil (kinetic viscosity: 57 mm$^2$/s (40° C.), 3 mm$^2$/s (100° C.)), density: 0.88 g/cm$^3$ (15° C.), flash point: 250° C. or more, pour point: −12.5° C. or less, total acid number: 0.05 mgKOH/g), synthetic oil (ISO viscosity grade: 100, kinetic viscosity: 94.7 mm$^2$/s (40° C.), 12.6 mm$^2$/s (100° C.)), ASTM color: L1.0, density: 0.90 g/cm$^3$ (15° C.), flash point: 250° C. or more, pour point: −10° C. or less, total acid number: 0.30 mgKOH/g) is applied. It should be noted that those physical property values of the lubricant oil are examples and the present invention is not limited to those values.

(Housing 142)

Figure 2A:
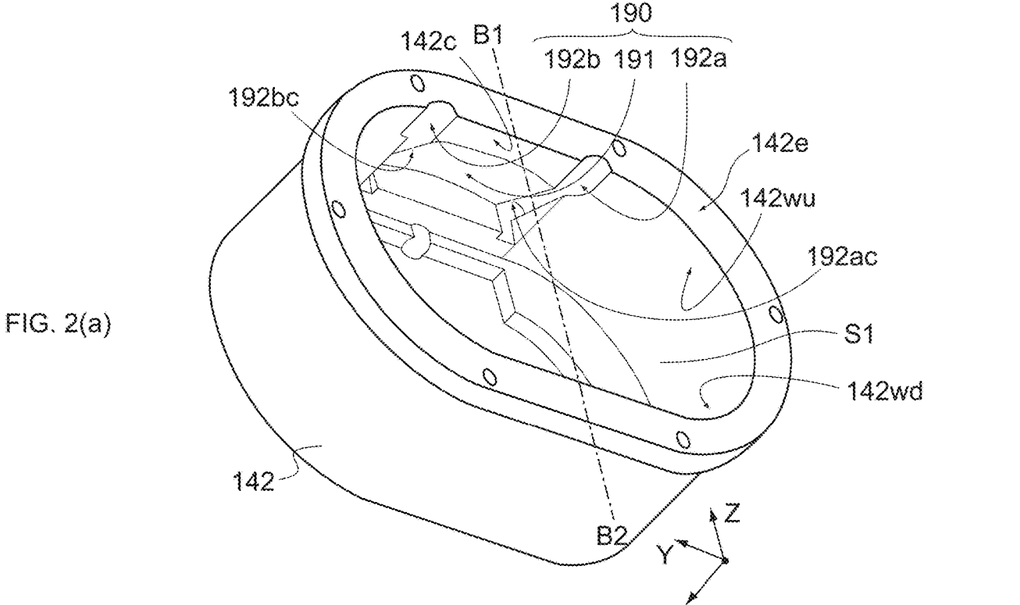
FIGS. 2(a)-2(b) Schematic perspective views each showing a housing of the vacuum pump.
Figure 2B:
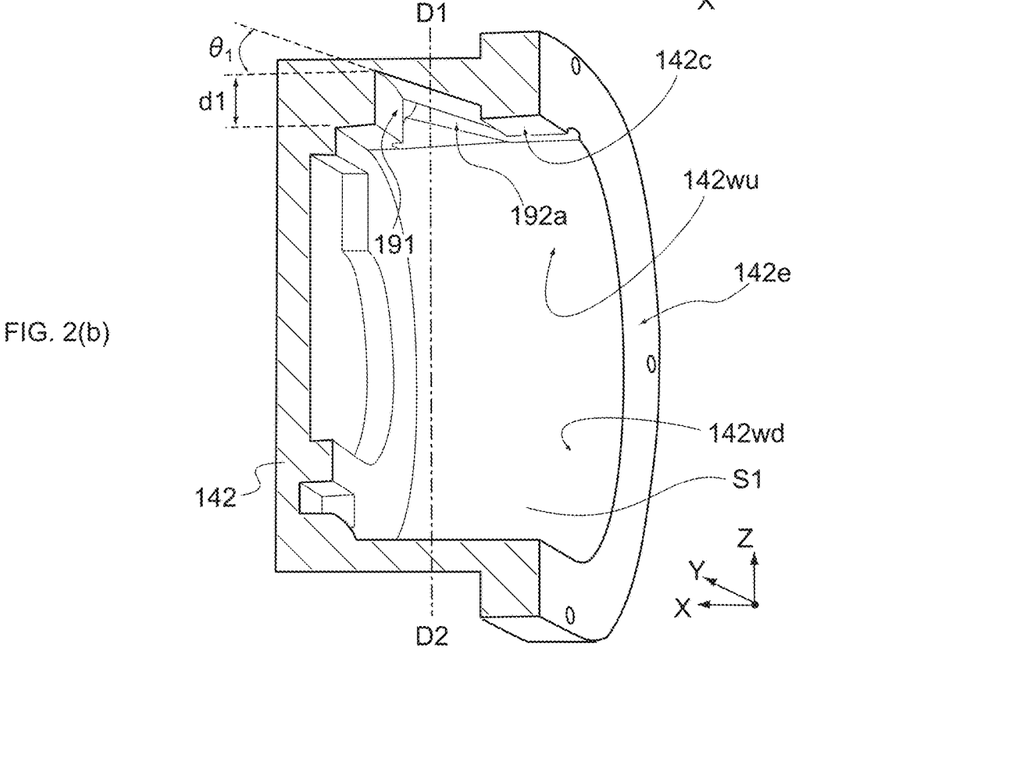
Figure 3:
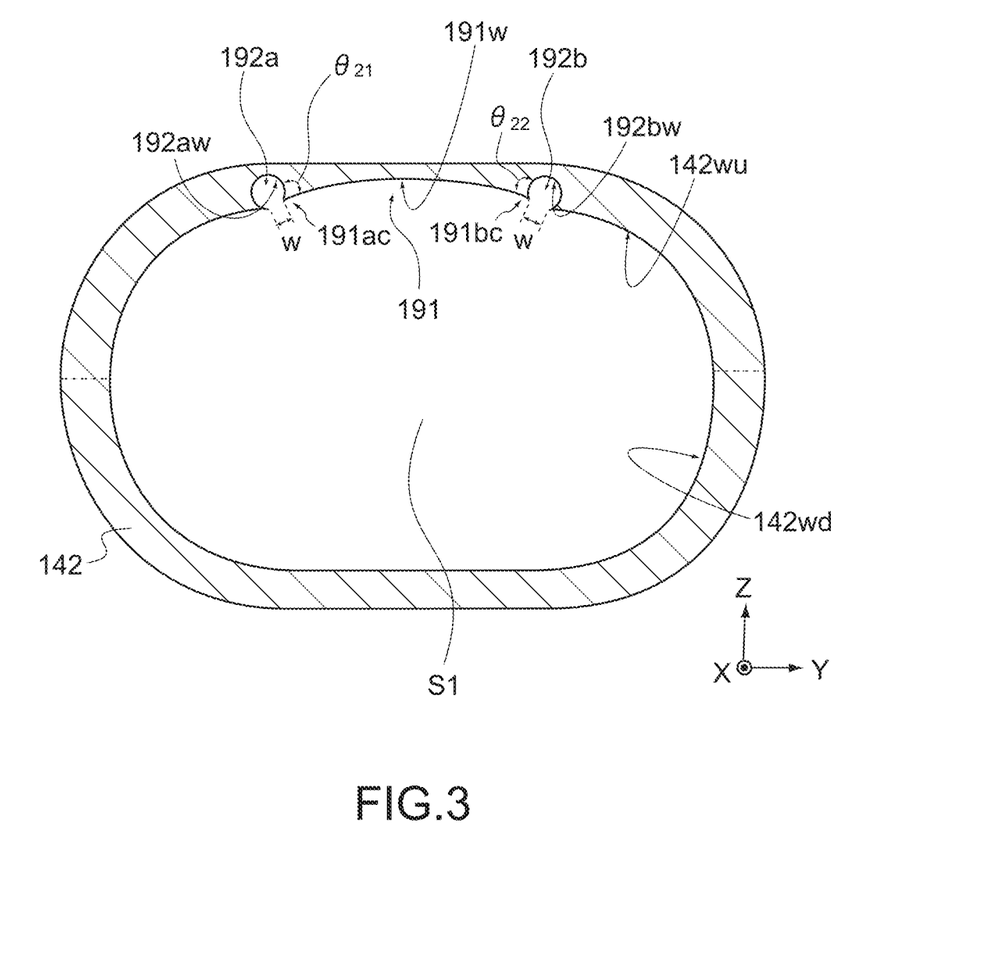
FIG. 3 A schematic cross-sectional view showing the housing of the vacuum pump.

FIG. 2(a) and FIG. 2(b) are schematic perspective views each showing the housing of the vacuum pump. FIG. 3 is a schematic cross-sectional view showing the housing of the vacuum pump. FIG. 2(a) shows a schematic perspective view inside the housing 142. FIG. 2(b) shows a cross-section perspective view as the housing 142 is taken along the line of B1-B2 on the X-Z plane of FIG. 2(a). Further, FIG. 3 shows a cut cross-section of the housing 142 as it is cut in the YZ-axis plane. For example, FIG. 3 shows an end surface along the line D1-D2 of FIG. 2(b).

In the housing 142, the recess portion 191 is provided in the inner-wall upper portion 142wu which faces the oil surface 180s of the lubricant oil 180. The respective recess portions 192a and 192b are aligned with the recess portion 191 in the direction (Y-axis direction) orthogonal to the axis direction (X-axis direction) of the rotor shaft 110 (or the rotor shaft 120). The recess portion 191 is provided between the recess portions 192a and 192b in the Y-axis direction. The recess portion 192a is located above the supply port 165 and the recess portion 192b is located above the supply port 166.

For example, the recess portion 191 is a tilted surface declining from a position higher than the level of a ceiling surface 142c of the space S1 to the level of the ceiling surface 142c from a side opposite to an end surface 142e of the housing 142 to a side of the end surface 142e. The respective recess portions 192a and 192b are provided on both sides of the recess portion 191 and are further provided on both sides of the ceiling surface 142c. The respective recess portions 192a and 192b extending from an interior side of the space S1 reach the end surface 142e and cut out parts of the end surface 142c.

Further, in the housing 142, a corner portion 192ac including an acute-angle tip end formed by the recess portion 191 and the recess portion 192a is configured, and a corner portion 192bc including an acute-angle tip end formed by the recess portion 191 and the recess portion 192b is configured.

A depth d1 of the recess portion 191 becomes gradually shallower from the lubricant oil-stirring plate 170 toward the bearing members 161 and 162. An angle $\theta_1$ (°) formed by an inner surface 191w of the recess portion 191 and the X-axis direction is set to 3 degrees (°) or more and 20 degrees or less, for example. When the angle $\theta_1$ is smaller than 3 degrees, it is difficult for the lubricant oil 180 to move along the recess portion 191 and the lubricant oil 180 flows down from the inner surface 191w. It is thus unfavorable. On the other hand, when the angle $\theta_1$ is larger than 20 degrees, the inclination of the recess portion 191 on the X-Z plane becomes steep, and it is necessary to configure the thickness of an upper portion of the housing 142 to be larger. The compactization of the housing 142 cannot be thus realized.

The inner surface 191w of the recess portion 191 is configured as a curved surface protruding in a depth direction of the recess portion 191. Regarding the inner surface 191w, it is favorable that the area of the inner surface 191w is set to be larger for the purpose of causing a larger amount of lubricant oil 180 to stick to it. For example, the inner surface 191w is constituted by a curved surface. For example, provided that a distance between the center axis of the rotor shaft 110 and the center axis of the rotor shaft 120 is L (mm), a curvature R (radius) of the inner surface 191w of the recess portion 191 in the YZ-axis plane is set to be equal to or larger than L/2 (mm). When the curvature R is smaller than L/2 (mm), it is necessary to configure the thickness of the upper portion of the housing 142 to be thick. It is thus unfavorable. On the other hand, when the inner surface 191w becomes flatter, it is difficult for the lubricant oil 180 to move along the recess portion 191 and the lubricant oil 180 flows down from the inner surface 191w. It is thus unfavorable. For example, the curvature R is set to 300 mm or more and 350 mm or less, though it is not limited to this range.

An inner surface 192aw of the recess portion 192a is configured as a curved surface protruding in the depth direction of the recess portion 192a. Further, an inner surface 192bw of the recess portion 192b is configured as a curved surface protruding in a depth direction of the recess portion 192b. A width of each of the recess portions 192a and 192b in the Y-axis direction is smaller than a width of the recess portion 191 in the Y-axis direction. The recess portion 192a and the recess portion 192b are line-symmetric with respect to the B1-B2 line, for example.

The recess portion 192a and the recess portion 192b may be arranged not to be line-symmetric with respect to the B1-B2 line. For example, the cross-sections of the recess portion 192a and the recess portion 192b may have different shapes. The recess portion 192a and the recess portion 192b may have different curvatures. The cross-sections of the recess portion 192a and the recess portion 192b may have the same shape and a distance of each of them from the center of the recess portion 191 may be different. In the figures of this embodiment, a configuration in which the recess portion 192a and the recess portion 192b are line-symmetric with respect to the B1-B2 line is illustrated as an example.

For example, the respective inner surfaces 192aw and 192bw of the recess portions 192a and 192b are configured to be curved surfaces protruding in the depth directions of the recess portions 192a and 192b. For example, the curvature R (radius) of the inner surface 192aw or 192bw on the YZ-axis plane is 4 mm or more and 6 mm or less. The curvatures R (radius) of the inner surfaces 192aw and 192bw on the YZ-axis plane may be the same as each other or may be different from each other. Further, the angle formed by the inner surfaces 191aw or 191bw and the X-axis direction may be the same as the angle $\theta_1$ (°) or may be different from the angle $\theta_1$ (°). The angle formed by the inner surface 191aw and the X-axis direction and the angle formed by the inner surface 191bw and the X-axis direction may be the same or may be different.

The inner surface 191w of the recess portion 191 is provided continuously with the inner surface 192aw of the recess portion 192a and the inner surface 192bw of the recess portion 192b. Here, a width W between the inner surface 191w and the inner-wall upper portion 142wu on the Y-Z plane is set to 6 mm or more. When the width W between the inner surface 191w and the inner-wall upper portion 142wu on the Y-Z plane is smaller than 6 mm, the lubricant oil 180 flowing along the inner surface 191w of the recess portion 191 cannot be stopped by the recess portions 192a and 192b. It is thus unfavorable.

In addition, at the boundary between the inner surface 191w of the recess portion 191 and the inner surface 192aw of the recess portion 192a, the angle $\theta_{21}$ (°) formed by the inner surface 191w and the inner surface 192aw is set to be equal to or smaller than 90°. Further, at the boundary between the inner surface 191w of the recess portion 191 and the inner surface 192bw of the recess portion 192b, the angle $\theta_{22}$ (°) formed by the inner surface 191w and the inner surface 192bw is set to be equal to or smaller than 90°. When each of the angles $\theta_{21}$ and $\theta_{22}$ is larger than 90°, the angles $\theta_{21}$ and $\theta_{22}$ become obtuse, and the lubricant oil 180 flowing along the inner surface 191w of the recess portion 191 cannot be stopped by the recess portions 192a and 192b. It is thus unfavorable.

(Configurations of Peripheries of Bearing Members 161 and 162)

Figure 4A:
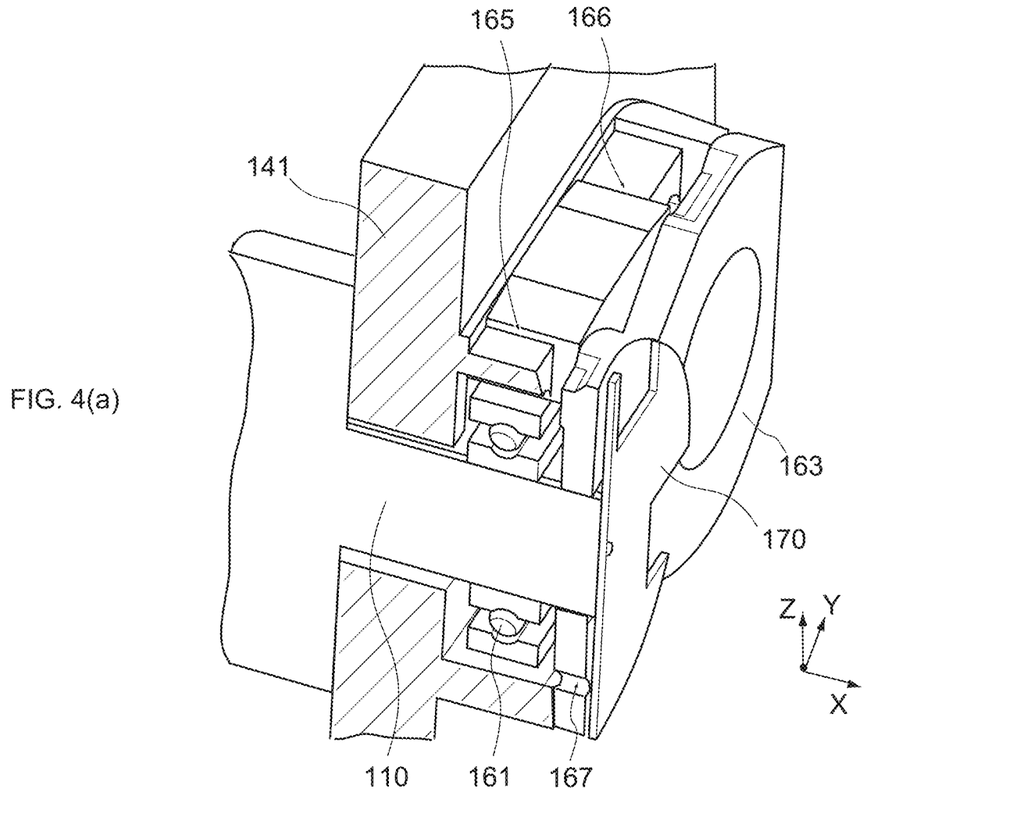
Figure 4B:
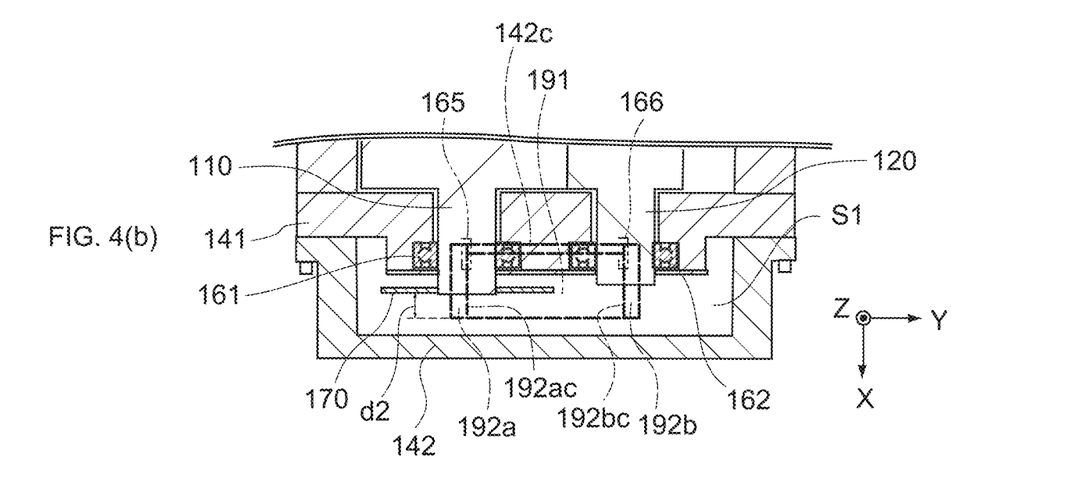
FIG. 4(b) is a schematic top view showing recess portions provided in the housing in a see-through state.

FIG. 4(a) is a schematic perspective view showing a periphery of the bearing member of the vacuum pump. In FIG. 4(a), a cross-section taken along the C1-C2 line in FIG. 1(a) is shown. FIG. 4(b) is a schematic top view showing the recess portions provided in the housing in a see-through state. In FIG. 4(b), a state in which the recess portions 191, 192a, and 192b provided in the housing 142 are seen through from the upper surface is drawn.

As shown in FIG. 4(a), the supply port 165 having a slit-like shape is provided above the bearing member 161 and the supply port 166 having a slit-like shape is provided above the bearing member 162.

For example, in a case where the lubricant oil 180 is made to drop down into the supply port 165 from above the supply port 165, the lubricant oil 180 reaches the bearing member 161 via the supply port 165 by its own weight. After that, the bearing member 161 is immersed in the lubricant oil 180 and further, the lubricant oil 180 is returned into the space S1 via a return port 167 arranged beneath the bearing member 161.

Similarly, in a case where the lubricant oil 180 is made to drop down into the supply port 166 from above the supply port 166, the lubricant oil 180 reaches the bearing member 162 via the supply port 166 by its own weight and the bearing member 162 is immersed in the lubricant oil 180. Then, the lubricant oil 180 is returned into the space S1 via the return port ((not shown)) arranged below the bearing member 162.

Further, as shown in FIG. 4(*b*), a part of the corner portion 192*ac* constituted by the recess portion 191 and the recess portion 192*a* is located directly above the supply port 165 and a part of a corner portion 192*bc* constituted by the recess portion 191 and the recess portion 192*b* is located directly above the supply port 166. For example, lowest portions of the corner portions 192*ac* and 192*bc* are positioned directly above the supply ports 165 and 166. Further, a distance d2 between the lubricant oil-stirring plate 170 and an end of the recess portion 191 in the X-axis direction is larger than a thickness of the lubricant oil-stirring plate 170. With this configuration, the lubricant oil 180 stirred by the lubricant oil-stirring plate 170 efficiently hits against the inner surface 191*w*.

(Operation of Vacuum Pump 1)

Figure 5A:
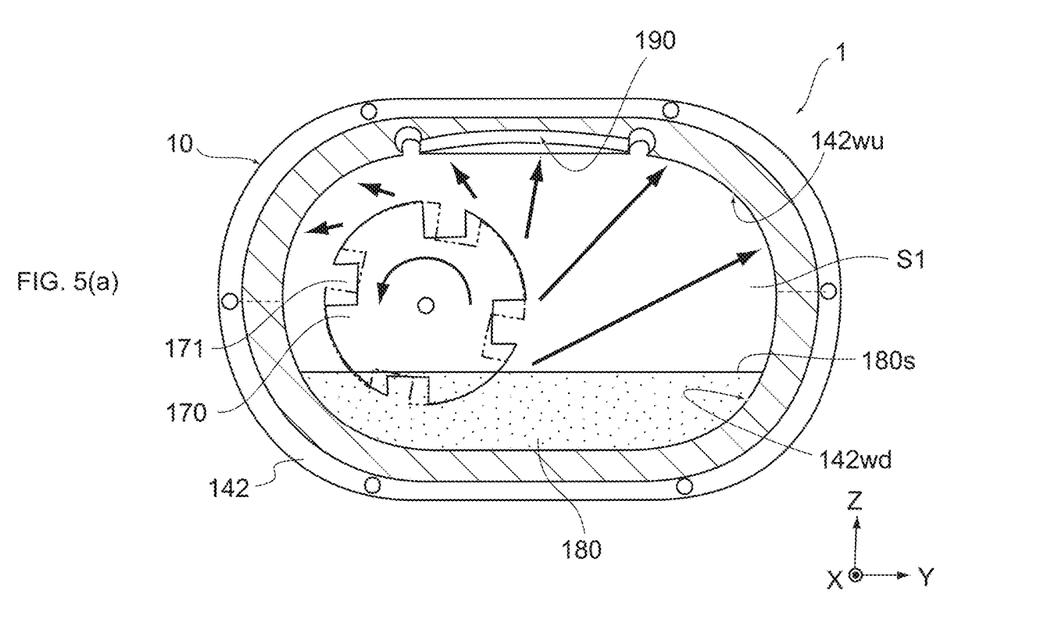
FIGS. 5(a)-5(b) Schematic cross-sectional views each showing an operation of the vacuum pump.
Figure 5B:
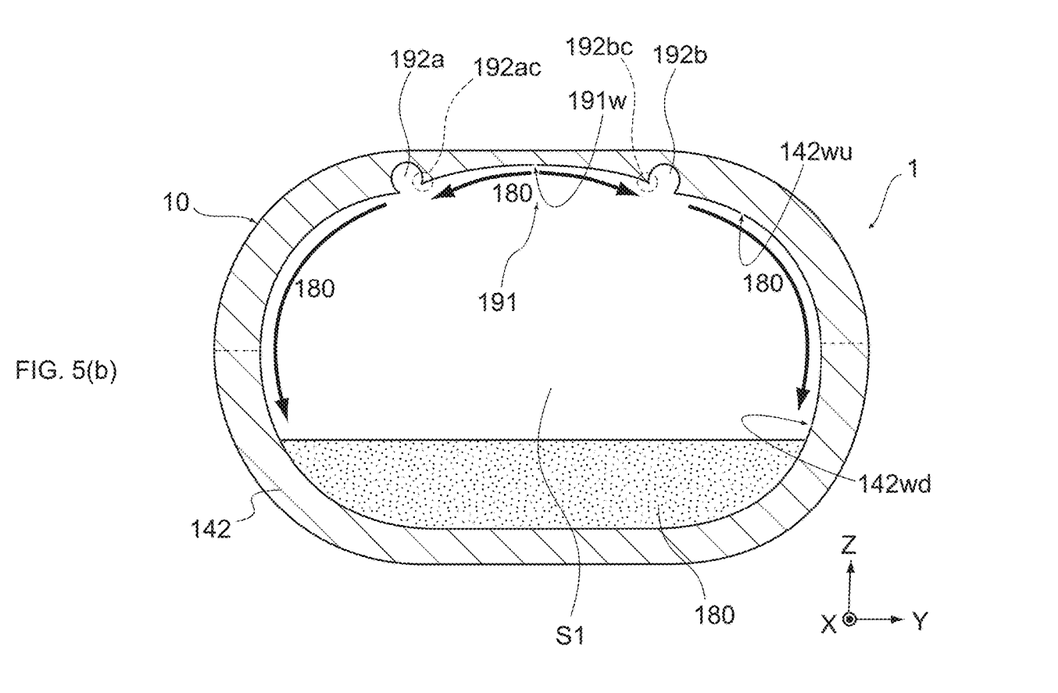
Figure 6:
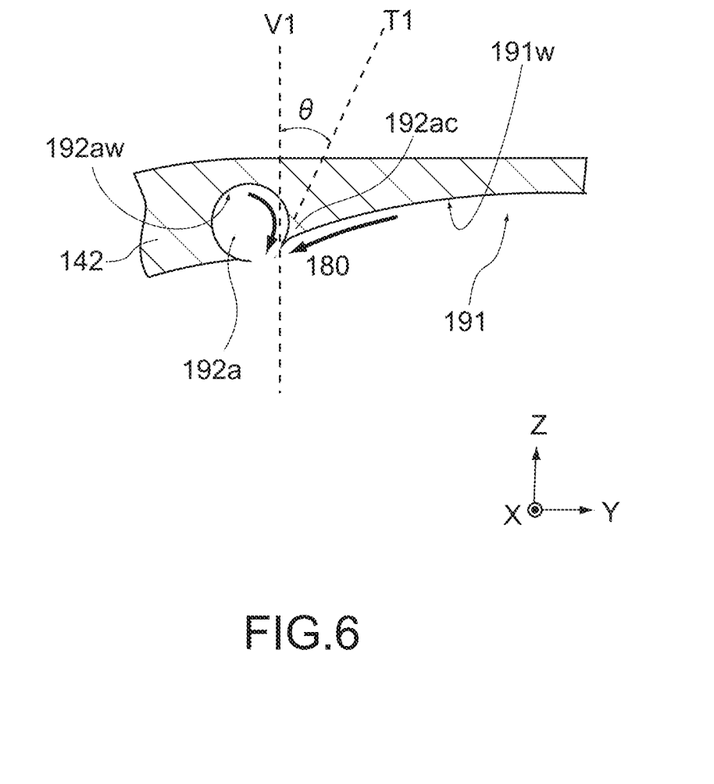
FIG. 6 A schematic cross-sectional view showing the operation of the vacuum pump.

FIG. 5(*a*) to FIG. 6 are schematic cross-sectional views each showing the operation of the vacuum pump. In FIG. 5(*a*) to FIG. 6, directions in which the lubricant oil 180 moves are schematically shown as arrows.

As shown in FIG. 5(*a*), when the lubricant oil-stirring plate 170 is rotated, the lubricant oil 180 is moved upward from the oil surface 180*s* by the cutout portions 171. Then, the lubricant oil 180 is sprinkled to an upper portion of the space S1 while the lubricant oil 180 having predetermined kinetic energy. Further, the lubricant oil 180 has predetermined viscosity and has predetermined wettability to the metal material that constitutes the housing 142. Therefore, in the inner wall (the inner-wall upper portion 142*wu* and the inner-wall lower portion 142*wd*) of the space S1, an oil film of the lubricant oil 180 is formed, and an oil film surface (surface in which the oil film faces the space S1) keeps a shape so that kinetic energy of an incident oil drop, surface tension of the oil film surface, and potential energy by its own weight of the oil film are well-matched. Further, the lubricant oil 180 sticking to the inner wall of the space S1 flows along the inner wall of the space S1 while keeping the surface tension of the oil film surface, and falls by the potential energy of the oil film as driving force.

For example, movement of the lubricant oil 180 after the lubricant oil 180 sticks to the inner-wall upper portion 142*wu* will be described as movement of the lubricant oil 180 on the YZ-axis plane and as movement of the lubricant oil 180 on the XZ-axis plane. In this embodiment, the lubricant oil 180 moves on the YZ-axis plane and further moves also on the XZ-axis plane.

First of all, the movement of the lubricant oil 180 on the YZ-axis plane will be described. In FIG. 5(*b*), the movement of the lubricant oil 180 in the space S1 on the YZ-axis plane is shown.

The oil drop of the lubricant oil 180 consistently sprinkled to the upper portion of the space S1 has kinetic energy combined the centrifugal force of the lubricant oil-stirring plate 170 with the force acting in a direction of rotation of the lubricant oil-stirring plate 170, for example. Therefore, the oil film sticking to an inner wall on a right side of the space S1 receives force (kinetic energy) to move to the right side of the space S1 from the oil drop and the oil film sticking to an inner wall on a left side of the space S1 receives force to move to the left side of the space S1 from the oil drop. Then, the lubricant oil 180 will move in such a direction that its potential energy decreases while receiving the kinetic energy and being supported by the surface tension of the oil film surface.

Therefore, the lubricant oil 180, which has hit against a portion of the inner-wall upper portion 142*wu* (side portion of the space S1) located beneath the recess portions 192*a* and 192*b*, do not immediately flow down while keeping the surface tension of the oil film surface because the inner-wall upper portion 142*w* is configured as the curved surface, Then, the lubricant oil 180 flows down along the inner-wall upper portion 142*wu* due to decrease in potential energy. In addition, the inner wall lower portion 142*wd* located below the inner-wall upper portion 142*wu* is also configured as the curved surface. Therefore, the lubricant oil 180 flows and falls along the inner-wall lower portion 142*wd* and returns to the bottom portion of the space S1.

On the other hand, lubricant oil 180 which has hit against the right side with respect to the center of the recess portion 191, receives force to move to the right side of the space S1 from the kinetic energy of the oil drop and lubricant oil 180 which has hit against the left side with respect to the center of the recess portion 191, receives force to move to the left side of the space S1 from the kinetic energy of the oil drop in the lubricant oil 180 which has hit against a portion of the inner-wall upper portion 142*wu*, which is located above the recess portions 192*a* and 192*b*, i.e., the recess portion 191. Further, the inner surface 191*w* of the recess portion 191 is constituted by a curved surface protruding upward. Therefore, the lubricant oil 180 does not immediately flow down from the inner surface 191*w* and flows down toward the recess portion 192*a* or the recess portion 192*b* along the inner surface 191*w* while keeping the surface tension of the oil film surface and decreasing in its own potential energy.

However, the inner surface 191*w* of the recess portion 191 is discontinuous due to the presence of the recess portions 192*a* and 192*b*. The lubricant oil 180 cannot continuously flow down along the inner-wall upper portion 142*wu*. The flow of the lubricant oil 180 is interrupted at the recess portions 192*a* and 192*b*.

For example, the inner surface 191*w* and the inner-wall upper portion 142*wu* are arranged, spaced apart from each other by the width W equal to or longer than 6 mm on the Z-Y plane due to the presence of the recess portion 192*a* (or the recess portion 192*b*). The angle $\theta_{21}$ (°) formed by the inner surface 191*w* and the inner surface 192*aw* and the angle $\theta_{22}$ (°) formed by the inner surface 191*w* and the inner surface 192*bw* are set to be equal to or smaller than 90°.

With this configuration, even in a case where the viscosity of the lubricant oil 180 becomes too low due to increase in temperature or where the kinetic energy of the lubricant oil 180 hitting against the inner surface 191*w* becomes too high due to increase in number of revolutions of the lubricant oil-stirring plate 170, a phenomenon that the lubricant oil 180 sticking to the inner surface 191*w* reaches the inner-wall upper portion 142*wu* beyond the recess portion 192*a* (or the recess portion 192*b*) is reliably inhibited.

For example, in a case where the width W between the inner surface 191*w* and the inner-wall upper portion 142*wu* on the Z-Y plane is smaller than 6 mm or where the angle $\theta_{21}$ or $\theta_{22}$ is larger than 90°, the lubricant oil 180 accumulated in the recess portions 192*a* and 192*b* along the inner surface 191*w* by its own weight can move to the inner-wall upper portion 142*wu* by receiving the kinetic energy of the oil drop because the oil films are connected to each other over the gaps (recess portions 192a and 192b), although an increase in thickness of the oil film due to the accumulation is also assumed to be one of causes. Therefore, the amount of lubricant oil 180 to be supplied into the supply ports 165 and 166 cannot be obtained.

In contrast, in this embodiment, the width W between the inner surface 191w and the inner-wall upper portion 142wu on the Z-Y plane is set to be equal to or larger than 6 mm and the angle $\theta_{21}$ or $\theta_{22}$ is set to be equal to or smaller than 90°. With this configuration, the flow of the lubricant oil 180 flowing along the inner surface 191w is stopped by the recess portions 192a and 192b and the lubricant oil 180 stops in front of the corner portion 192ac and in front of the corner portion 192bc. In other words, the lubricant oil 180 flowing down along the inner surface 191w is trapped near the corner portions 192ac and 192bc.

In particular, regarding the inner surfaces 192aw and 192bw of the respective recess portions 192a and 192b, the curvature R (radius) of the inner surface 192aw or 192bw on the YZ-axis plane is set to be 4 mm or more and 6 mm or less. That is, the recess portions 192a and 192b have a depth suitable for stopping the flow of the lubricant oil 180.

For example, the lubricant oil 180 flowing down along the inner surface 191w flows the inner surface 192aw (or the inner surface 192bw) as continuous matter. In this case, when the curvature R (radius) of the inner surface 192aw (or the inner surface 192bw) becomes smaller than 4 mm, the depth of the recess portion 192a (or the recess portion 192b) is configured to be shallow, specifically, equal to or smaller than 8 mm. Therefore, still as the continuous matter, the lubricant oil 180 flows also along the inner surface 192aw (or the inner surface 192bw) and reaches the bottom portion of the space S1 via the inner-wall upper portion 142wu and the inner-wall lower portion 142wd.

In contrast, in this embodiment, each of the inner surfaces 192aw and 192bw has the curvature R (radius) 4 mm or more and 6 mm or less and the depth of each of the recess portions 192a and 192b is configured to be deep, specifically, 8 mm or more and 12 mm or less. Therefore, even if the lubricant oil 180 is going to jump from the inner surface 191w to the inner surface 192aw (or the inner surface 192bw) while keeping the kinetic energy, the kinetic energy to jump and its own weight of the lubricant oil 180 at the recess portion 192a (or the recess portion 192b) compete with each other and that jump is stopped. That is, the lubricant oil 180 is reliably trapped near the corner portions 192ac and 192bc.

In particular, as shown in FIG. 6, the angle θ formed by a normal line V1 extending in the Z-axis direction and a tangential line T1 of the corner portion 192ac on a side of the recess portion 192a is configured to be larger than 0 degrees. Therefore, the kinetic energy of the lubricant oil 180 which flows along the inner surface 191w and flows upward on the inner surface 192aw of the recess portion 192a and the kinetic energy of the lubricant oil 180 which flows down along the inner surface 192aw of the recess portion 192a by its own weight compete with each other. Then, the lubricant oil 180 is trapped near the corner portion 192ac.

In addition, in this embodiment, in a case where the amount of lubricant oil 180 stirred by the lubricant oil-stirring plate 170 is different between left and right regions of the space S1, it is also possible to evenly adjust the amount of lubricant oil 180 which flows along left and right regions of the inner surface 191w by arranging the recess portion 192a and the recess portion 192b not to be line-symmetric with respect to the B1-B2 line.

Figure 7A:
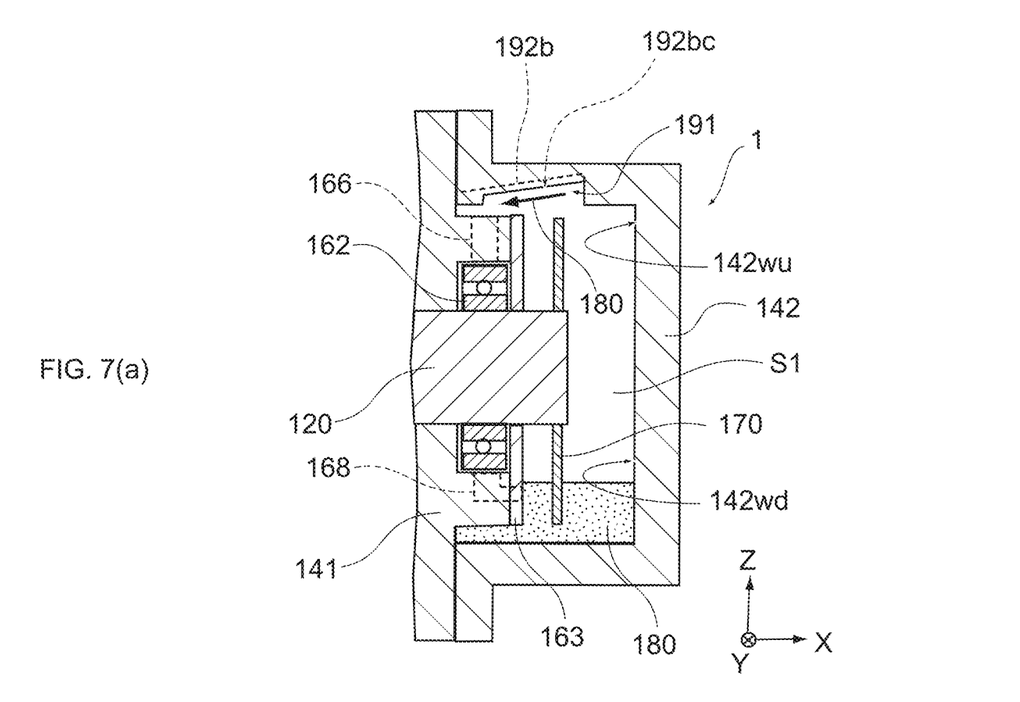
FIGS. 7(a)-7(b) Schematic cross-sectional views each showing the operation of the vacuum pump.
Figure 7B:
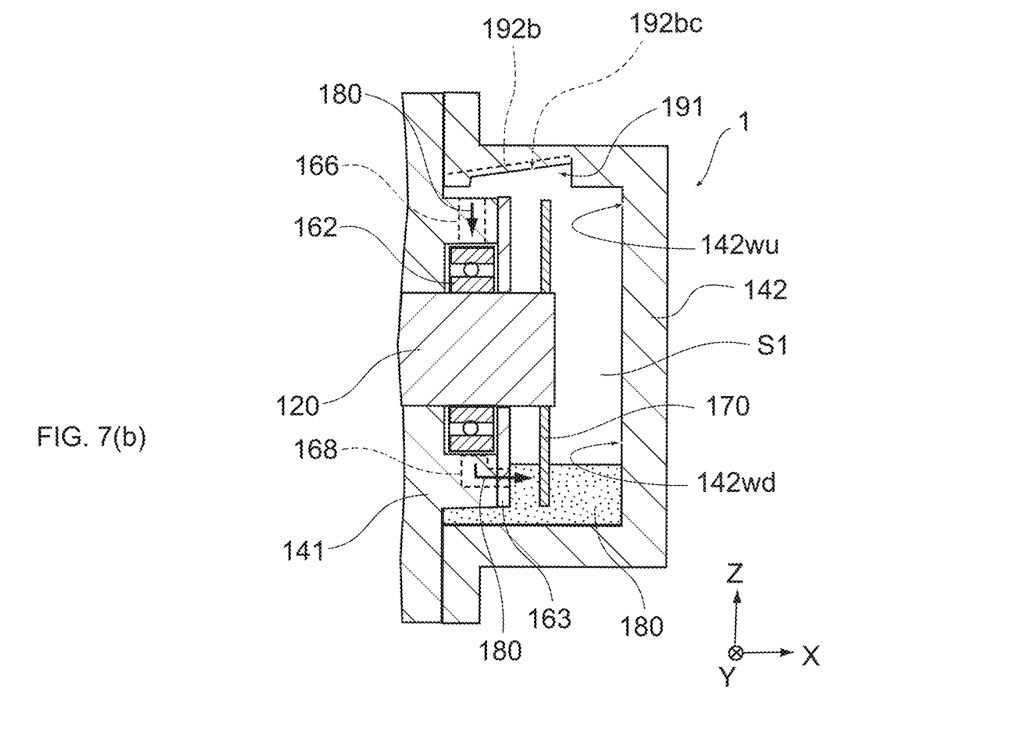

Next, the movement of the lubricant oil 180 on the XZ-axis plane will be described. In FIG. 7(a) and FIG. 7(b), the movement of the lubricant oil 180 in the space S1 on the YZ-axis plane is shown. Although the recess portion 192b of the recess portions 192a and 192b is shown in FIG. 7(a) and FIG. 7(b), a similar phenomenon can occur also at the recess portion 192a.

As shown in FIG. 7(a), since the recess portion 191 is configured to be obliquely downward toward the bearing member 162, the lubricant oil 180 trapped near the corner portion 192bc of the recess portion 192b flows down toward the bearing member 162 along the surface of the corner portion 192bc. That is, the lubricant oil 180 moves along the recess portion 191 or the recess portion 192b in the X-axis direction and is guided above the supply port 166 of the housing 142.

Next, as shown in FIG. 7(b), the lubricant oil 180 which has reached the supply port 166 flows down into the supply port 166 by its own weight and the bearing member 162 is immersed in the lubricant oil 180. After that, the lubricant oil 180 is returned to the bottom portion of the space S1 via a return port 168 below the bearing member 162.

In the vacuum pump 1, this series of movement of the lubricant oil 180 is repeated and the lubricant oil 180 is efficiently supplied to the bearing members 161 and 162.

Figure 8:
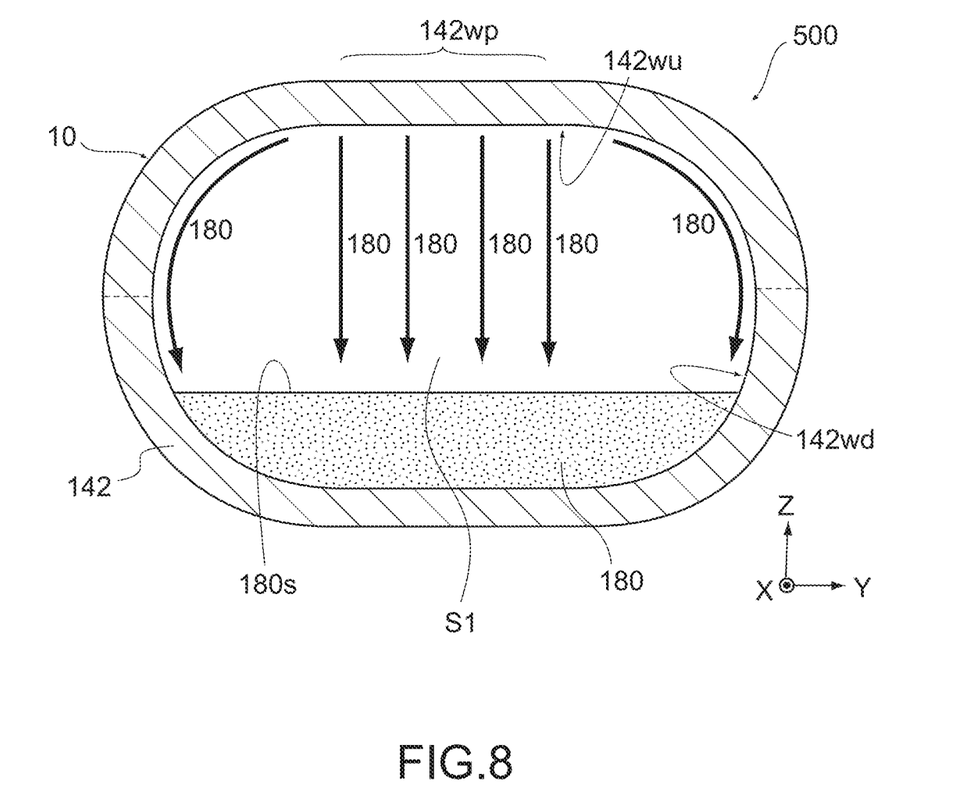
FIG. 8 A schematic cross-sectional view showing an operation of a vacuum pump according to a comparative example.

Here, FIG. 8 is a schematic cross-sectional view showing an operation of a vacuum pump according to a comparative example.

In an inner-wall upper portion 142wu of a vacuum pump 500 according to a comparative example, the recess portions 191, 192a, and 192b are not formed. In such a vacuum pump 500, when the lubricant oil 180 stirred by the lubricant oil-stirring plate 170 hits against the inner-wall upper portion 142wu, the surface tension is superior to spreading of the lubricant oil 180 over the inner-wall upper portion 142wu because the inner-wall upper portion 142wu which faces the oil surface 180s is flat, and thus the lubricant oil 180 more easily falls by its own weight. With this configuration, the lubricant oil 180 does not move along the inner-wall upper portion 142wu and immediately flows down to the bottom portion of the space S1 from a flat portion 142wp.

Therefore, in the comparative example, the amount of lubricant oil 180 which reaches the supply ports 165 and 166 decreases, and the efficiency to supply the lubricant oil 180 to the bearing members 161 and 162 is lowered.

In contrast, in the vacuum pump 1 according to this embodiment, the recess portions 190 (recess portions 191, 192a, and 192b) for moving the lubricant oil 180 above the supply ports 165 and 166 are provided in the inner-wall upper portion 142wu of the housing 142. With this configuration, the lubricant oil 180 stirred by the lubricant oil-stirring plate 170 hits against the inner-wall upper portion 142wu and is then efficiently guided above the supply ports 165 and 166 via the recess portion 190. As a result, in the vacuum pump 1, the lubricant oil 180 is efficiently supplied to the bearing members 161 and 162.

In particular, in the vacuum pump 1, it becomes unnecessary to attach a member (e.g., oil guide member) that guides the lubricant oil 180 above the supply ports 165 and 166 to the supply ports 165 and 166. The lubricant oil 180 can be efficiently supplied to the bearing members 161 and 162 by the simple mechanism (recess portion 190) provided in the housing 142.

Further, the lubricant oil 180 is efficiently supplied to the bearing members 161 and 162. Therefore, the cooling effect of the lubricant oil 180 on the bearing members 161 and 162 is enhanced.

Further, the housing 142 can be formed as an integrated object by casting with a dedicated mold. With the dedicated mold, complicated working is not required for forming the recess portion 190. That is, the housing 142 can be easily formed.

(Modified Example of Recess Portions 191, 192a, and 192b)

Figure 9A:
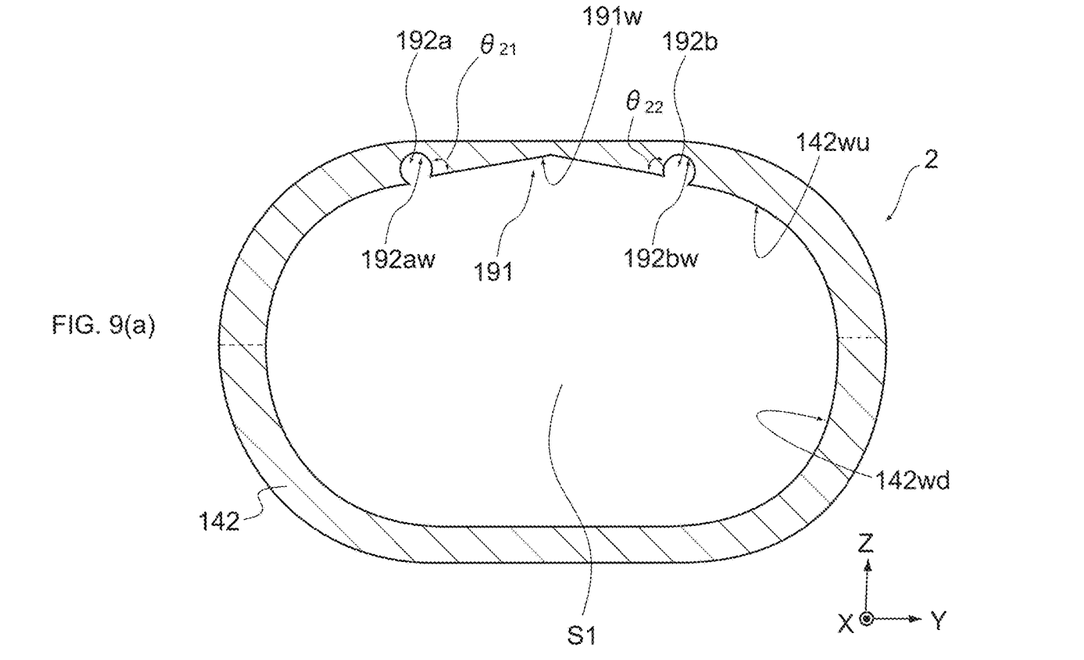
FIG. 9(a)-9(b) Schematic cross-sectional views each showing a modified example of the recess portion.
Figure 9B:
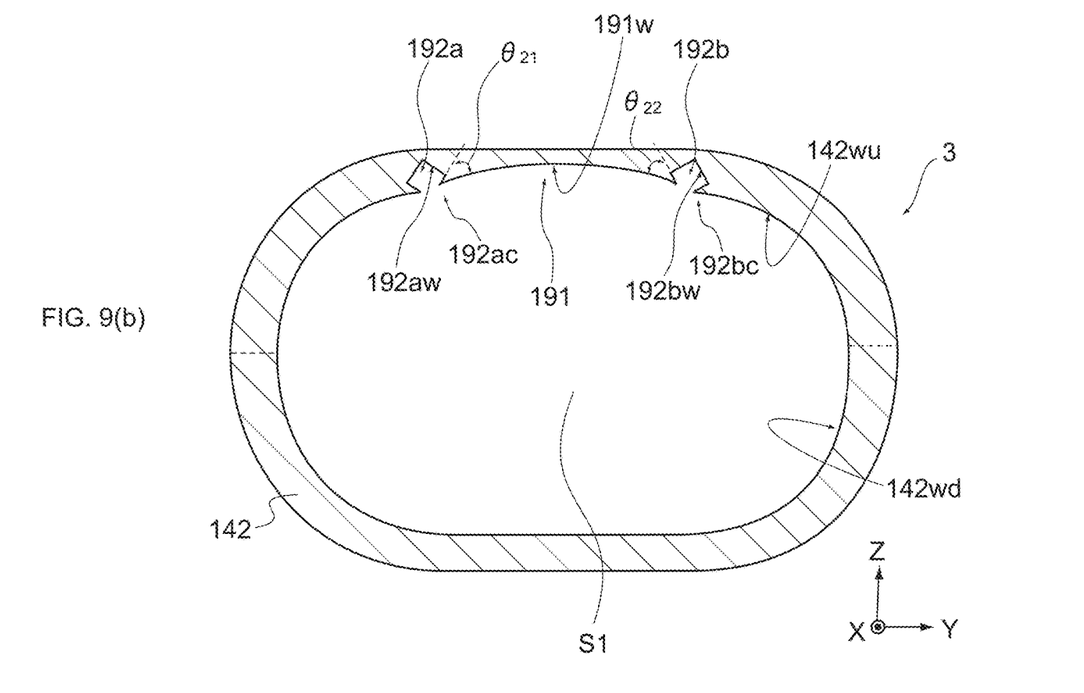

FIG. 9(a) and FIG. 9(b) are schematic cross-sectional views each showing a modified example of the recess portions.

The inner surface 191w of the recess portion 191 may be constituted by a polygonal surface protruding in the depth direction. For example, in the example of a vacuum pump 2 shown in FIG. 9(a), the shape of the cross-section of the inner surface 191w on the YZ-axis plane is a triangular shape. Also with such a configuration, the inner surface 191w of the recess portion 191 is configured as a downward tilt. Therefore, the lubricant oil 180 immediately flows down from the inner surface 191w and flows down along the inner surface 191w. After that, the lubricant oil 180 moves above the supply ports 165 and 166.

Further, the inner surfaces 192aw and 192bw of the recess portions 192a and 192b may be constituted by polygonal surfaces protruding in the depth direction. For example, in the example of a vacuum pump 3 shown in FIG. 9(b), the shape of the cross-section of each of the inner surfaces 192aw and 192bw on the YZ-axis plane is a rectangular shape. Also with such a configuration, the angles $\theta_{21}$ and $\theta_{22}$ are equal to or smaller than 90° and the lubricant oil 180 flowing along the inner surface 191w of the recess portion 191 are trapped near the corner portions 192ac and 192bc.

Figure 10:
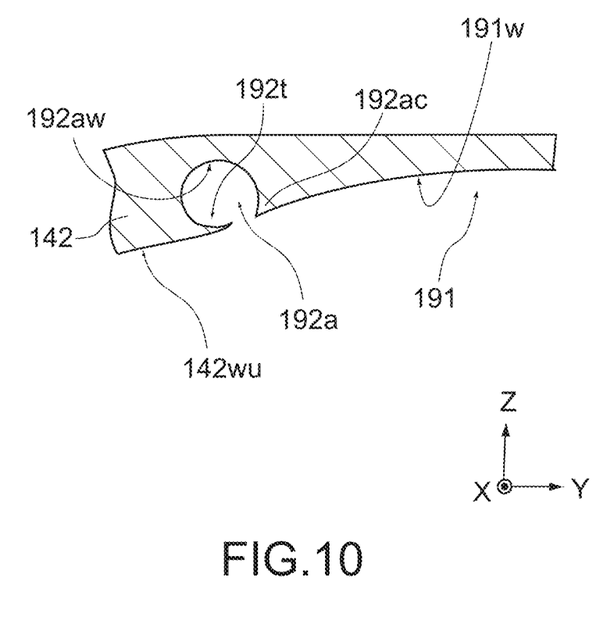
FIG. 10 A schematic cross-sectional view showing a modified example of the recess portion.

FIG. 10 is a schematic cross-sectional view showing a modified example of the recess portion.

A recess portion 192a shown in FIG. 10 includes a catching portion 192t that captures the lubricant oil 180. The catching portion 192t is tilted downward toward the supply port 165 as in the recess portion 192a. With this configuration, even when the lubricant oil 180 flowing along the inner surface 191w of the recess portion 191 flows upward on the inner surface 192aw of the recess portion 192a and is going to flow to the inner wall upper-portion 142wu, the lubricant oil 180 is caught by the catching portion 192t. With this configuration, the amount of lubricant oil 180 which can be supplied into the supply port 165 further increases. Since the housing 142 is configured by casting, such working can be easily achieved. The catching portion 192t having the same function may be provided also in the recess portion 192b.

Although the embodiments of the present invention have been described above, the present invention is not limited only to the above-mentioned embodiments and various modifications can be made as a matter of course. The respective embodiments are not limited to the independent form and can be combined as long as it can be technically performed.

REFERENCE SIGNS LIST 1, 2, 3, 500 vacuum pump
10 pump main body
11, 12 pump rotor
20 drive unit
21 motor
22, 23 synchronization gear
24, 131, 132, 141, 142 housing
25 cover
30 control unit
110, 120 rotor shaft
111, 121 one end portion
112, 122 other end portion
142c ceiling surface
142e end surface
142wu inner-wall upper portion
142wd inner wall lower portion
142wp flat portion
151, 152, 161, 162 bearing member
153, 163 cover
165, 166 supply port
167, 168 return port
170 lubricant oil-stirring plate
171 cutout portion
180 lubricant oil
180s oil surface
190, 191, 192a, 192b recess portion
191w, 192aw, 192bw inner surface
192ac, 192bc corner portion
192t catching portion
S1 space
P1 pump chamber
E1 gas intake port
E2 gas discharge port

The invention claimed is:

1. A vacuum pump, comprising:
a first housing;
a second housing attached to the first housing and forming a space together with the first housing, the space storing a lubricant oil;
a rotor shaft passing through the first housing;
a lubricant oil-stirring plate housed in the space and attached to the rotor shaft; and
a bearing member fixed to the first housing and rotatably supporting the rotor shaft,
the first housing including a supply port enabling the lubricant oil to be supplied to the bearing member,
the second housing including an inner-wall upper portion, the lubricant oil being stirred by the lubricant oil-stirring plate and hitting against the inner-wall upper portion, the inner-wall upper portion including a recess portion enabling the lubricant oil to move above the supply port,
the recess portion including a first recess portion and a second recess portion,
the second recess portion being aligned with the first recess portion in a first direction orthogonal to an axis direction of the rotor shaft,
a width of the second recess portion in the first direction being smaller than a width of the first recess portion in the first direction, and
a depth of the first recess portion being configured to become shallower toward the bearing member from the lubricant oil-stirring plate.

2. The vacuum pump according to claim 1, wherein an inner surface of the first recess portion is configured as a curved surface protruding in a depth direction of the first recess portion or a polygonal surface protruding in the depth direction.

3. The vacuum pump according to claim 2, wherein an inner surface of the second recess portion is configured as a curved surface protruding in a depth direction of the second recess portion or a polygonal surface protruding in the depth direction.

4. The vacuum pump according to claim 2, wherein
the inner surface of the first recess portion is provided continuously with an inner surface of the second recess portion, and
an angle formed by the inner surface of the first recess portion and the inner surface of the second recess portion is equal to or smaller than 90 degrees at a boundary between the inner surface of the first recess portion and the inner surface of the second recess portion.

5. The vacuum pump according to claim 1, wherein
an inner surface of the second recess portion is configured as a curved surface protruding in a depth direction of the second recess portion or a polygonal surface protruding in the depth direction.

6. The vacuum pump according to claim 1, wherein
the inner surface of the first recess portion is provided continuously with the inner surface of the second recess portion, and
an angle formed by the inner surface of the first recess portion and the inner surface of the second recess portion is equal to or smaller than 90 degrees at a boundary between the inner surface of the first recess portion and the inner surface of the second recess portion.

* * * * *